US010234734B2

(12) United States Patent
Cowell, III et al.

(10) Patent No.: US 10,234,734 B2
(45) Date of Patent: Mar. 19, 2019

(54) IN-PLANE SWITCHING LIQUID CRYSTAL DISPLAY BACKPLANE USING AMORPHOUS METAL NON-LINEAR RESISTORS AS ACTIVE SUB-PIXEL DEVICES

(71) Applicants: Oregon State University, Corvallis, OR (US); Amorphyx, Corvallis, OR (US)

(72) Inventors: E. William Cowell, III, Corvallis, OR (US); John Newton, Auckland (NZ)

(73) Assignee: Oregon State University, Corvallis, OR (US)

( * ) Notice: Subject to any disclaimer, the term of this patent is extended or adjusted under 35 U.S.C. 154(b) by 0 days.

(21) Appl. No.: 15/745,180

(22) PCT Filed: Jul. 21, 2016

(86) PCT No.: PCT/US2016/043230
§ 371 (c)(1),
(2) Date: Jan. 16, 2018

(87) PCT Pub. No.: WO2017/019420
PCT Pub. Date: Feb. 2, 2017

(65) Prior Publication Data
US 2018/0203309 A1 Jul. 19, 2018

Related U.S. Application Data

(60) Provisional application No. 62/196,359, filed on Jul. 24, 2015.

(51) Int. Cl.
*G02F 1/1343* (2006.01)
*G02F 1/1335* (2006.01)
(Continued)

(52) U.S. Cl.
CPC .. *G02F 1/134363* (2013.01); *G02F 1/133528* (2013.01); *G02F 1/136286* (2013.01);
(Continued)

(58) Field of Classification Search
CPC .................. G02F 1/1362; G02F 1/136213
See application file for complete search history.

(56) References Cited

U.S. PATENT DOCUMENTS 6,225,968 B1  5/2001  denBoer
6,243,062 B1  6/2001  denBoer
(Continued)

FOREIGN PATENT DOCUMENTS

WO      2014074360      5/2014

*Primary Examiner* — Phu Vu
(74) *Attorney, Agent, or Firm* — Niels Haun; Dann, Dorfman, Herrell & Skillman, P.C.

(57) ABSTRACT

A physical layout for a circuit using amorphous metal non-linear resistors as active devices for an in-plane switching liquid crystal display sub-pixel is provided. The lower interconnect of the two amorphous metal non-linear resistors and the lower electrode of the storage capacitor may be concurrently deposited and patterned. The area of the storage capacitor is defined by the overlap of the data signal inter-connect and the storage capacitor lower electrode, which is easily modified through the size of the lower electrode and/or the size of the data signal interconnect where it overlaps the lower electrode and does not degrade the aperture ratio of the pixel. Two embodiments of sub-pixel circuits are described. One, which employs a select line bridge, enables the use of full dot inversion of the image data. The second only allows row inversion of the image data.

10 Claims, 9 Drawing Sheets

(51) Int. Cl.
*G02F 1/1362* (2006.01)
*G09G 3/36* (2006.01)

(52) U.S. Cl.
CPC ..... *G09G 3/3659* (2013.01); *G02F 1/136213* (2013.01); *G02F 2001/13625* (2013.01); *G09G 3/3614* (2013.01); *G09G 2300/0426* (2013.01)

(56) References Cited

U.S. PATENT DOCUMENTS

| | | |
|---|---|---|
| 7,277,149 B2 | 10/2007 | Kim |
| 2005/0225543 A1 | 10/2005 | Boer |
| 2006/0232536 A1* | 10/2006 | den Boer ............ G09G 3/3659 345/91 |
| 2007/0046883 A1 | 3/2007 | Shimizu |
| 2009/0316061 A1 | 12/2009 | Kao |
| 2010/0123744 A1 | 5/2010 | Iba |
| 2011/0261028 A1 | 10/2011 | Goh |
| 2014/0293166 A1 | 10/2014 | Shih |

* cited by examiner

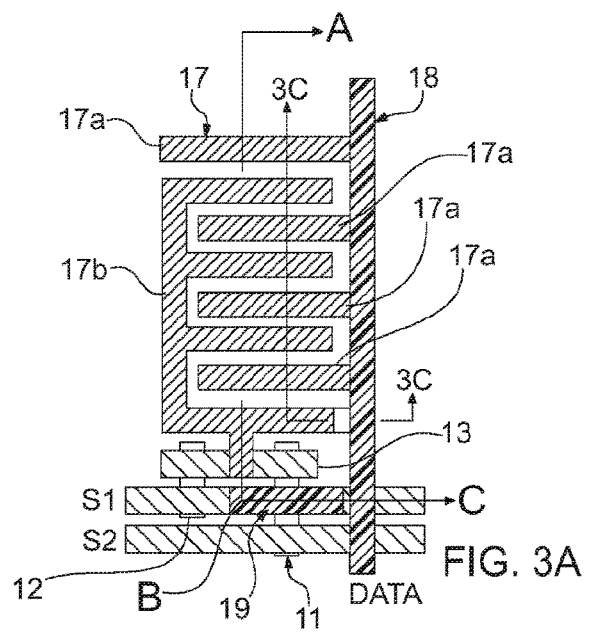
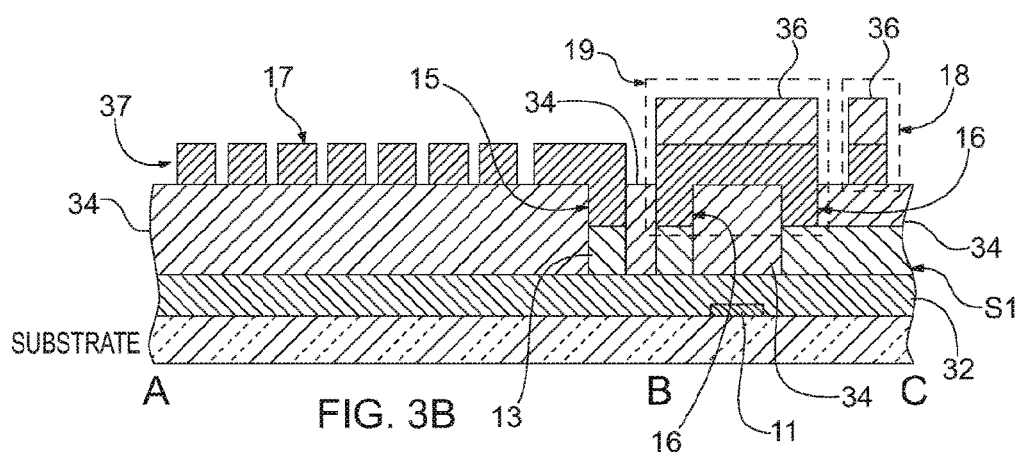
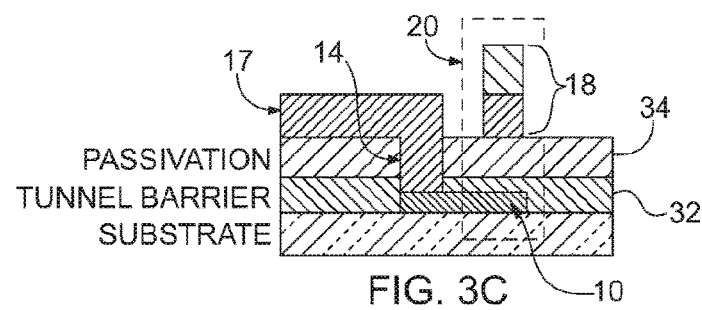

IN-PLANE SWITCHING LIQUID CRYSTAL DISPLAY BACKPLANE USING AMORPHOUS METAL NON-LINEAR RESISTORS AS ACTIVE SUB-PIXEL DEVICES

This application is a 371 application of International Application No. PCT/US16/43230 filed Jul. 21, 2016, which claims the benefit of priority of U.S. Provisional Application No. 62/196,359 filed on Jul. 24, 2015, the entire contents of which application(s) are incorporated herein by reference.

FIELD OF THE INVENTION

In one of its aspects, the present invention relates generally to the realization of a liquid crystal display backplane having a matrix of pixels used to modulate the polarization of a liquid crystal material parallel to the substrate within the pixel. Active devices of the present invention may include amorphous metal thin-film non-linear resistors which allow for the control of liquid crystal polarization in each pixel, and therefore, the pixel brightness.

BACKGROUND OF THE INVENTION

A liquid crystal display (LCD) that employs an in-plane switching (IPS) sub-pixel circuit is presently considered state-of-the-art technology. IPS LCD has benefits in viewing angle and operational speed compared to a more traditional vertical alignment (VA) based LCD sub-pixel circuit. The primary distinction between IPS and VA LCD sub-pixel circuits is the relative location of the two electrodes (i.e., sub-pixel electrodes) between which an electric field is applied to polarize a liquid crystal material located between the two electrodes. The extent to which the liquid crystal material is polarized controls the amount of light that is transmitted through the backplane. The control of light transmission through the backplane is the means through which a digital image is created on an LCD. IPS based sub-pixel circuits have both electrodes located on one substrate (i.e., the backplane), whereas VA based sub-pixel circuits have one electrode on the backplane and one electrode on a second substrate (i.e., the color filter, CF). Present IPS LCD technology employs a thin-film transistor (TFT), located on the backplane, to control the magnitude of the electric field applied between sub-pixel electrodes that, in turn, controls the digital image on the IPS LCD.

The LCD backplane, which is a glass substrate onto which active devices, conducting layers and insulating layers are fabricated, controls an image on a liquid crystal display through precisely polarizing a liquid crystal material located between the backplane and another layer of glass. The second layer of glass, in certain embodiments known as color filter glass (CF), is the location of color filters, one per sub-pixel, used to create color images. Presently, the preferred backplane active device is the thin-film transistor (TFT), which is a semiconductor based device comprised of sequentially deposited and patterned thin-film layers. Thin-film semiconductor materials used in TFTs have many limitations, including low carrier mobility, light and temperature sensitivity, and fabrication complexities, which create performance and manufacturing cost issues. Thus, new devices which overcome such limitations, such as those disclosed herein, represent an advance in the state of the art.

SUMMARY OF THE INVENTION

Amorphous metal non-linear resistors (AMNR) may be particularly desirable for use in circuits of the present invention, because and AMNR does not employ semiconductor materials, and therefore, an LCD backplane based on AMNRs can overcome the performance and cost issues associated with TFT based LCD backplanes. (AMNRs are further described in published PCT application WO 2014074360 and U.S. Pat. No. 9,099,230, the entire contents of which are incorporated herein by reference.) An AMNR based LCD backplane can therefore provide an important advance in the art. For example, the use of pixel electrodes that modulate the polarization of liquid crystal materials in the plane of the LCD backplane substrate, in-plane switching (IPS), has advanced the performance of LCDs in terms of picture quality. The use of AMNRs as the active devices in an IPS LCD backplane may provide high-performance LCDs that are manufactured with simple materials and processes, thereby reducing manufacturing costs.

Thus, in one of its aspects, the present invention relates to a sub-pixel circuit for in-plane switching in a liquid crystal display backplane, where the circuit may include AMNRs along with methods for the production of such circuit. In particular, an amorphous metal thin-film may be patterned to provide, in a single layer, electrical interconnects for each of two or more AMNRs and a lower electrode of a storage capacitor.

In an additional aspect, the present invention may provide a method of fabricating a sub-pixel circuit employing two AMNRs and a storage capacitor possessing an AMTF lower electrode deposited concurrently with the AMNR amorphous metal interconnects. The sub-pixel circuit may be disposed on a substrate that supports the materials used to physically realize the circuit. In addition, the sub-pixel circuit may allow for the application of an electric field parallel to a substrate across a liquid crystal material disposed between two electrodes located in the same physical plane. Through the described exemplary method of fabrication, the present invention may provide interconnection of the described sub-pixel circuits into an addressable matrix of pixels that may be controlled independently to produce an image on an LCD. The exemplary manufacturing processes described herein may provide a means of LCD backplane fabrication capable of producing IPS based LCDs with reduced manufacturing costs relative to semiconductor based TFT backplane manufacturing costs. The reduction in manufacturing costs may result from fewer process steps, simpler process steps, and the elimination of semiconductor content.

BRIEF DESCRIPTION OF THE DRAWINGS

The foregoing summary and the following detailed description of exemplary embodiments of the present invention may be further understood when read in conjunction with the appended drawings, in which:

FIGS. 3A-3C schematically show cross-sectional views of the device of FIG. 2D, where FIG. 3B shows the cross-section across path A-B-C and FIG. 3C shows the cross-section across path 3C-3C;

DETAILED DESCRIPTION OF THE INVENTION

Figure 1:
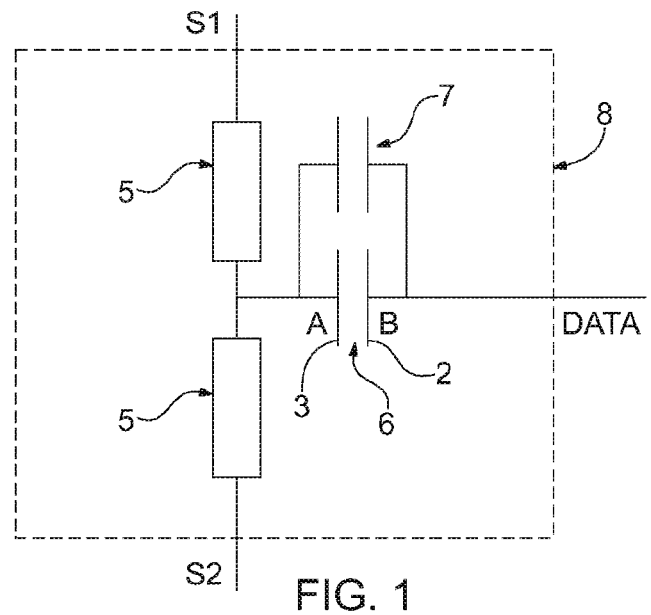
FIG. 1 schematically shows a lumped element model of an in-plane switching liquid crystal display sub-pixel circuit.

Referring now to the figures, wherein like elements are numbered alike throughout, exemplary devices and methods in accordance with the present invention are shown which may provide in-plane switching in a liquid crystal display backplane. Such devices and methods may typically include amorphous metal non-linear resistors (AMNRs), which may be described as a two terminal device possessing symmetric current-voltage (IV) characteristics. For example, FIG. 1 schematically illustrates a non-limiting exemplary lumped element diagram of a sub-pixel circuit 8 where two AMNRs 5 may be used to precisely polarize a liquid crystal material LC through the application of an electric field to a capacitor 6. The area within the dashed line 8 denotes the physical elements of a sub-pixel. The capacitor 6 may include electrodes 2, 3 electrically connected to nodes A and B, with a dielectric comprised of the liquid crystal material LC disposed between the electrodes 2, 3. The electrodes 2, 3 may comprise indium tin oxide (ITO) disposed in the same physical plane on a backplane substrate, and nodes A and B may be the data and select nodes of the sub-pixel controlled by the sub-pixel circuit 8. A storage capacitor 7 may be electrically connected in parallel to the liquid crystal capacitor 6 to provide advantages to the operation of the sub-pixel circuit 8. The storage capacitor buffers the voltage located on the liquid crystal capacitor 6, thereby reducing the voltage dependent capacitance and leakage effects existing for the liquid crystal capacitor 6.

Liquid crystal materials are long molecules that change orientation in response to an electric field applied across the liquid crystal material, i.e., liquid crystal materials are polarized through the application of an electric field. Polarization is, therefore, a physical process where the liquid crystal molecules are physically moved, or more precisely, rotated. A liquid crystal material, when repeatedly rotated in the same direction many times, experiences less resistance to rotation in the same direction. Less rotational resistance changes the magnitude of polarization of a liquid crystal material at the same applied electric field magnitude, which is an undesirable effect. To avoid a polarization magnitude change, the polarity of an electric field that is applied to a liquid crystal material may be regularly changed or, more precisely, inverted. Certain non-limiting embodiments of the described invention allow for the inversion of applied electric fields to an array of IPS LCD sub-pixels by both row and columns in the array. The inversion of sequential rows of an array in addition to the inversion of sequential columns in the array is referred to, by those skilled in the art, as dot inversion. In another non-limiting embodiment of the described invention, referred to those skilled in the art as row inversion, sequential rows in an array of IPS LCD sub-pixels are inverted while sequential columns are not.

FIGS. 2A-3C schematically illustrate a non-limiting, exemplary process for fabricating an in-plane switching (IPS) LCD sub-pixel circuit corresponding to the circuit model shown in FIG. 1. (The area within the dashed box of FIGS. 2A-2D corresponds to the outlined area in FIG. 1.) The exemplary process sequence presented in FIGS. 2A-3C may employ the patterning of four material layers which compares favorably to the present state of the art for high-volume manufacturing of high definition and ultra-high definition IPS LCD televisions which employs five patterning steps. Additionally, the exemplary process allows for the use of dot inversion with respect to the polarity of adjacent sub-pixels.

First, an amorphous metal thin film (AMTF) with thickness less than 50 nm may be deposited concurrently and patterned into a lower electrode 10 of the storage capacitor 7 and patterned into two AMNR lower interconnects 11, 12. The lower interconnects 11, 12 may provide first and second row select lines for addressing the pixel within a matrix of pixels. The AMTF layer may be ultra-smooth with an RMS roughness less than 0.5 nm when deposited. The ultra-smooth, i.e., <0.5 nm RMS, surface morphology of the AMTF electrode 10 and interconnects 11, 12 can provide the ability to precisely apply an electric field across the storage capacitor 7 comprising lower electrode 10 and/or AMNRs 5 comprising lower interconnects 11, 12. After the patterning of the AMTF to provide the electrode 10 and interconnects 11, 12, an unpatterned dielectric layer comprising, but not limited to, metallic oxides, metallic nitrides, semiconductor oxides or semiconductor nitrides, may be deposited onto the electrode 10 and interconnects 11, 12 to provide a tunnel barrier 32, FIG. 3B.

Subsequently a layer comprising, but not limited to, a thin film of crystalline metal or a stack of two or more thin films of crystalline metals, may be deposited onto the tunnel barrier 32. The deposited crystalline metal thin-film, or stack of crystalline metal thin-films, may then be patterned to form select line interconnects, S1, S2 and select interconnect node 13 (which corresponds to node A in FIG. 1) between the select lines S1, S2, FIGS. 2B, 3B.

An insulating, dielectric layer 34 comprising, but not limited to, metallic oxides, metallic nitrides, semiconductor oxides or semiconductor nitrides, may be deposited onto the patterned select lines S1, S2 and interconnect node 13. The insulating layer 34 may function as the second layer of dielectric for the storage capacitor 7, as a passivation layer for the AMNRs 5, and as an inter-layer dielectric (ILD) located above the select lines S1, S2, and below subsequently deposited metal layers. A hole in the dielectric layer 34 may be subsequently patterned to provide a storage capacitor contact 14, a select interconnect node contact 15, and select line bridge contacts 16, FIG. 2C.

Finally, a top layer metal stack may be deposited onto the dielectric layer 34. A first layer 37 of the stack may include a transparent conducting oxide, e.g., indium tin oxide (ITO) layer 37. The ITO layer 37 may form the electrodes 17a, 17b of an IPS liquid crystal capacitor 17 corresponding to the liquid crystal capacitor 6 illustrated in FIG. 1. The subsequent layer(s) 36 of the metal stack may be sequentially deposited onto the ITO layer 37 and may comprise either a thin film of crystalline metal or a stack of two or more thin films of crystalline metals. The crystalline metal thin film or the stack of two or more thin films of crystalline metals, in conjunction with the ITO layer 37, may provide a data signal interconnect 18 and the select line bridge 19, through which column inversion may be effected. Since the lower interconnects 11, 12 of the AMNRs 5 may provide first and second row select lines, the combination of row select by the AMNRs 5 and column inversion by the select line bridge 19 together can effect dot inversion in an IPS LCD. The contact between the data signal interconnect 18 and the ITO liquid crystal capacitor 17 may be made through the sequential deposition of the data signal interconnect 18 directly onto the ITO liquid crystal capacitor layer 37. Thus, correlating the structures in FIGS. 2A-3C to those in FIG. 1, the storage capacitor 7 of FIG. 1 can be seen to be realized by the combination of the lower electrode 10, the tunnel barrier 32, the insulating layer 34, and the data signal interconnect 18 to provide storage capacitor 20, FIG. 3C. Likewise, one AMNR 5 of FIG. 1 can be seen to be realized by the combination of the interconnect 12, the tunnel barrier 32, the select line S1, and the select interconnect node 13, and the other AMNR 5 of FIG. 1 by the combination of the interconnect 11, the tunnel barrier 32, select line S2, and the select interconnect node 13.

In a certain embodiment of this invention, a process sequence to pattern the top layer metal stack may use, but is not limited to, a multi-tone exposure process. This process allows for the formation of the IPS liquid crystal capacitor 17, data signal interconnect 18, and the select line bridge 19 through one photolithographic mask.

In another embodiment of the described invention, the chemistries used to etch the ITO layer 37 and the subsequently deposited crystalline metal layer or layers 36 may be engineered to etch only the ITO or the crystalline metal layer(s). The described etch chemistries, therefore, may be defined as selective to the layer that is being etched by them. The use of selective etch chemistries may enhance the effectiveness of multi-tone photolithographic patterning techniques and may also allow for the use of two separate masking layers.

Figure 2A:
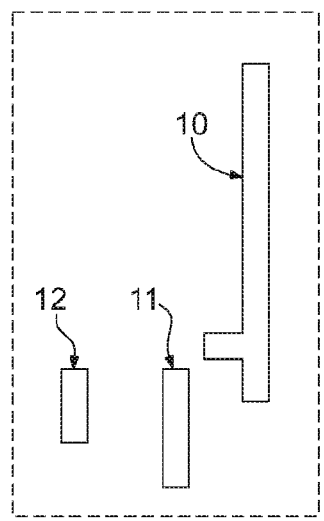
FIGS. 2A-2D schematically show an exemplary process for forming a physical device corresponding to the model of FIG. 1, in which the device includes a dual select in-plane switching LCD sub-pixel circuit with two amorphous metal non-linear resistors and a storage capacitor formed with concurrently deposited and patterned an AMTF first layer.
Figure 2B:
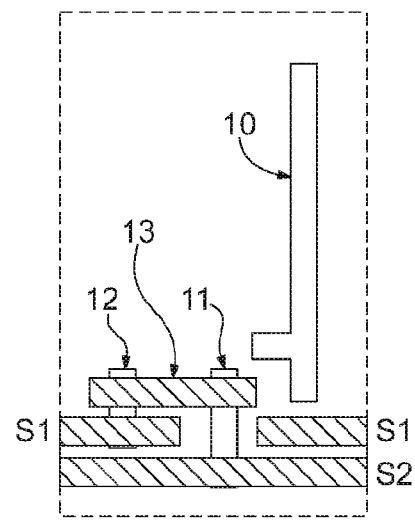
Figure 2C:
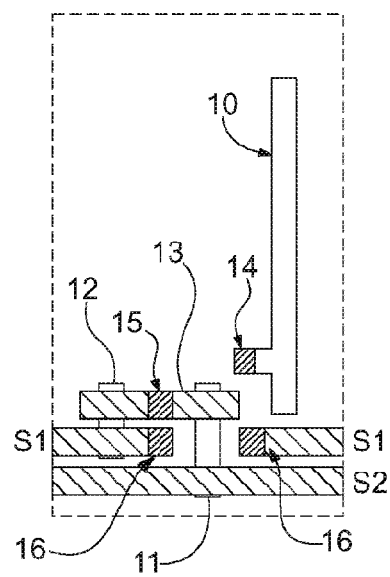
Figure 2D:
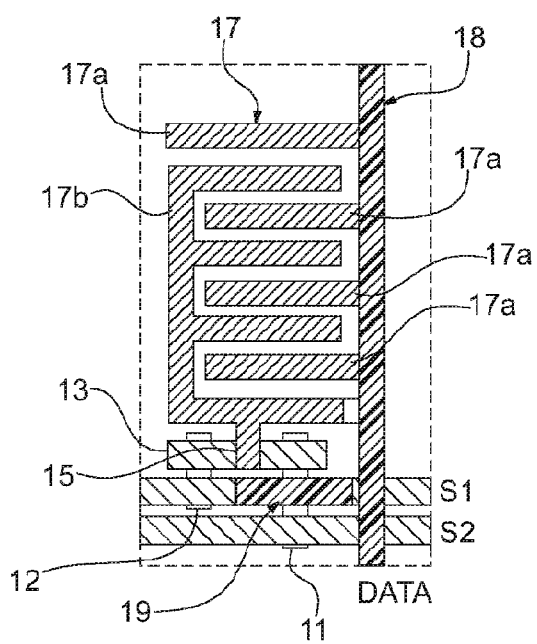

FIGS. 3A-3C schematically illustrate cross sectional views of the device of FIG. 2D. The cross sectional view along the path A-B-C shows the path of the select line bridge 19 over the AMNR 5 comprising select line S2 and the select interconnect node 13. As the ITO is more resistive than crystalline metals, it can be important to have the crystalline metal or crystalline metal stack 36 incorporated into the select line bridge 19 to keep the select line resistance low. Two contact holes 16 in the ILD (dielectric layer 34) provide the means through which the select line bridge 19 may be connected to the select line S1. The cross sectional view through points 3C-3C illustrate the means by which one of the ITO electrodes 17b of the liquid crystal capacitor 17 may be connected to the storage capacitor 20. The ITO/storage capacitor contact 14 may be patterned through both the ILD 34 and the tunnel barrier 32 allowing contact between the ITO of the liquid crystal capacitor electrode 17b and the storage capacitor lower electrode 10.

Storage capacitor area may be defined by the overlap between the storage capacitor AMTF lower electrode 10 and the data signal interconnect 18. Storage capacitor area may, therefore, be easily modulated by the dimensions of the AMTF lower electrode 10 and/or the dimensions of the data signal interconnect 18 where it overlaps the AMTF lower electrode 10. Additionally, the storage capacitor 20, will not significantly decrease the amount of light that is transmitted through the IPS LCD sub-pixel as it is located underneath the data signal interconnect 18. The percentage of light transmitted through an IPS LCD sub-pixel is an important consideration to sub-pixel design. Therefore, the fabrication sequence described in this disclosure that creates a storage capacitor 20 within an AMNR based IPS LCD sub-pixel provides an important contribution to light transmission.

Figure 4A:
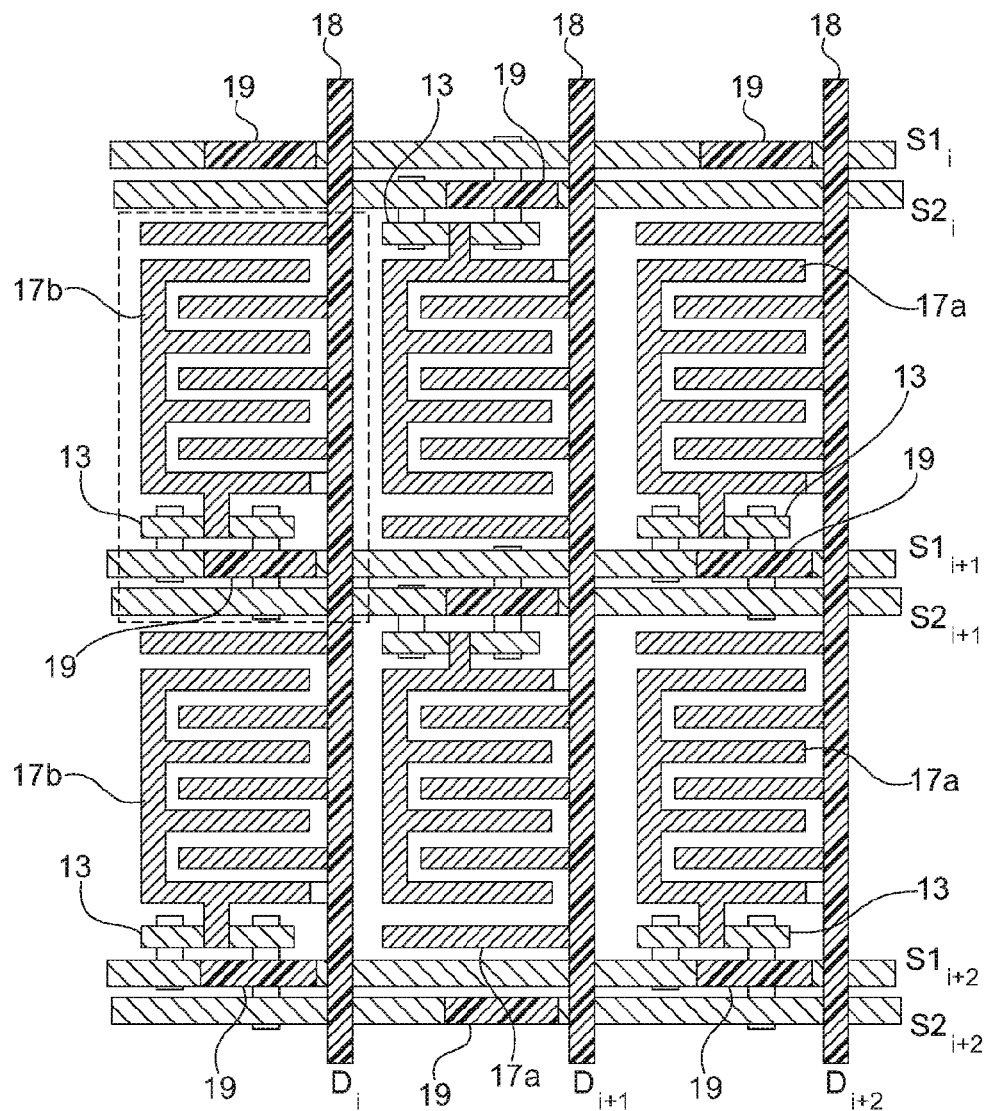
FIGS. 4A-4B schematically show the means through which individual sub-pixels may be connected to form a matrix of sub-pixels that may be addressed independently with row and column inversion.
Figure 4B:
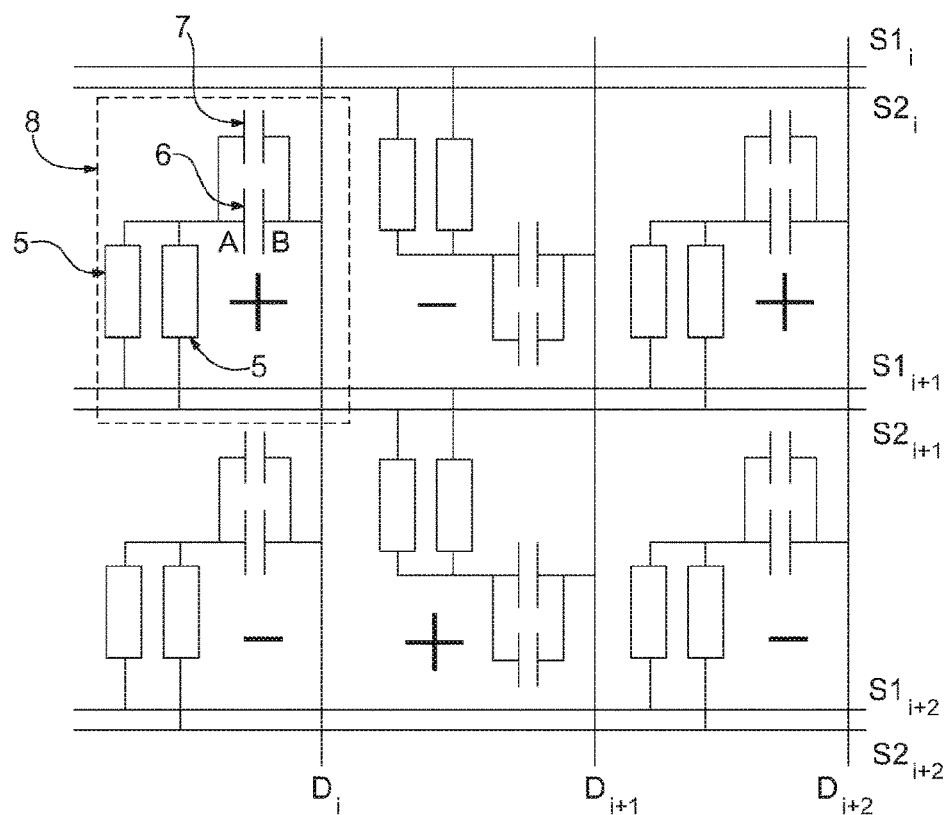

IPS LCD sub-pixels using AMNRs, as described herein, may be connected into an array as shown in FIGS. 4A-4B; the area of the dashed line of FIG. 4A corresponds to the area of the dashed line in FIG. 2D, and the area of the dashed line of FIG. 4B corresponds to the area of the dashed line in FIG. 1. The polarity of the sequential pairs of select lines, e.g., $S1_i$ and $S2_i$, then $S1_{i+1}$ and $S2_{i+1}$, may alternate between positive and negative polarity, giving rise to row inversion. Through the use of the select line bridge 19, sequential data signal columns $D_i$, $D_{i+1}$ may have alternating polarity across row of sub-pixels, giving rise to column inversion. The combination of row inversion and column inversion leads to dot inversion. The polarity of the data signals applied to the liquid crystal capacitors 17 is shown as + and − in FIG. 4B, providing a schematic representation of dot inversion. Dot inversion (a current best practice in IPS LCD televisions) is readily achieved using AMNR based sub-pixels using four patterning steps by the invention described herein.

In certain embodiments of the described invention, row inversion without column inversion, i.e., no dot inversion, provides sufficient image quality for an IPS LCD. FIGS. 5A-5D schematically illustrate an exemplary, non-limiting sequence of fabrication process steps used to create an AMNR based IPS LCD sub-pixel without column inversion. The area of the dashed line of FIGS. 5A-5D corresponds to the area of the dashed line in FIG. 1.

First an amorphous metal thin film (AMTF) with thickness less than 50 nm is deposited and patterned into a storage capacitor lower electrode 510 and two AMNR lower interconnects 511, 512, one for select line S25 and one for select line S15. Without the need for column inversion, in certain embodiments of the described invention, select line S15 and select line S25 may be positioned on opposite sides of the IPS LCD sub-pixel and, therefore, there is no need for a select line bridge. Removal of the select line bridge reduces the number of contact holes in the sub-pixel from 4 contacts to 3 contacts, which may be an advantage. After the described patterning of the AMTF, an unpatterned dielectric layer comprised of, but not limited to, metallic oxides, metallic nitrides, semiconductor oxides or semiconductor nitrides, may be sequentially deposited onto the patterned AMTF interconnects 511, 512 and storage capacitor lower electrode 510 to provide a tunnel barrier 532 thereover, FIG. 6B.

Subsequently a layer comprised of, but not limited to, a thin film of crystalline metal or a stack of two or more thin films of crystalline metals, may be deposited onto the tunnel barrier 532. The layer of deposited crystalline metal thin-film, or stack of crystalline metal thin-films, may then be patterned to form the select line interconnects, S15 and S25, and the select interconnect nodes 513 between the select lines which corresponds to node A in FIG. 1. There may be two select interconnect nodes in a sub-pixel that does not provide dot inversion.

Figure 6A:
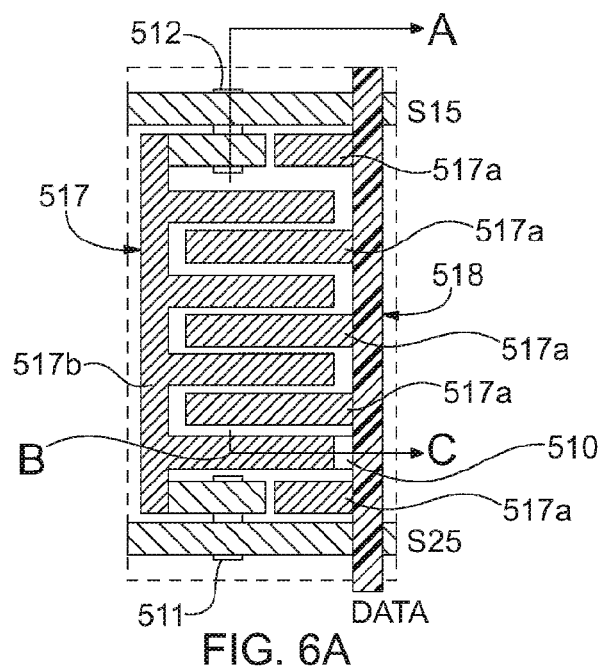
FIGS. 6A-6B schematically show an exemplary implementation of an AMNR based IPS LCD sub-pixel circuit that does not enable column inversion, and a cross section through path A-B-C, with a storage capacitor formed between a data signal interconnect, the storage capacitor having an amorphous metal lower electrode.
Figure 6B:
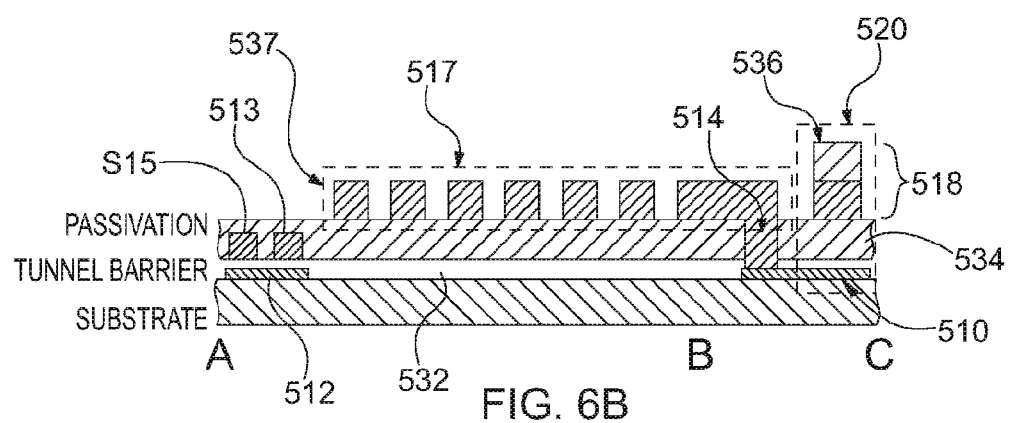

An insulating, dielectric layer 534 comprised of, but not limited to, metallic oxides, metallic nitrides, semiconductor oxides or semiconductor nitrides, may be sequentially deposited onto the patterned interconnect lines S15, S25 and interconnect node 513, FIG. 6B. The insulating layer 534 may function as the second layer of dielectric for the storage capacitor 520, as a passivation layer for the AMNR interconnects 511, 512, and as an inter-layer dielectric (ILD) located above the select lines, S15 and S25, and below subsequently deposited metal layers. Holes in the ILD may subsequently be patterned as a storage capacitor contact 514 and select interconnect node contacts 515.

Thereafter, a top layer metal stack may be deposited onto the ILD. The first layer 537 of the stack may be a transparent conducting oxide, i.e., indium tin oxide (ITO). The ITO layer 537 may provide the electrodes 517a, 517b of an IPS liquid crystal capacitor 517 corresponding to the liquid crystal capacitor 6 illustrated in FIG. 1. The subsequent layer(s) of the metal stack 536 may be sequentially deposited onto the ITO layer 537 and may be comprised either a thin film of crystalline metal or a stack of two or more thin films of crystalline metals. The crystalline metal thin film 536 or the stack of two or more thin films of crystalline metals, in conjunction with the ITO layer 537, may provide a data signal interconnect 518. The contact between the data signal interconnect 518 and the ITO liquid crystal capacitor 517 may be made through the sequential deposition of the data signal interconnect layer 536 directly onto the ITO liquid crystal capacitor layer 537.

In a certain embodiment of this invention, a process sequence to pattern the top layer metal stack may use, but is not limited to, a multi-tone exposure process. This process allows for the formation of the IPS liquid crystal capacitor 517 and the data signal interconnect 518 through one photolithographic mask.

In another embodiment of the described invention, the chemistries used to etch the ITO layer 537 and the subsequently deposited crystalline metal layer or layers may be engineered to etch only the ITO or the crystalline metal layer(s). The described etch chemistries may, therefore, be defined as selective to the layer that is being etched by them. The use of selective etch chemistries may enhance the effectiveness of multi-tone photolithographic patterning techniques and also allows for the use of two separate masking layers.

Storage capacitor area may be defined by the overlap between the storage capacitor AMTF lower electrode 510 and the data signal interconnect 518. Storage capacitor area may be therefore, easily modulated by the dimensions of the AMTF lower electrode 510 and/or the area of the data signal interconnect 518 where it overlaps with the AMTF lower electrode 510. Additionally, the storage capacitor 520, will not significantly decrease the amount of light that is transmitted through the IPS LCD sub-pixel as it is located underneath the data signal interconnect 518. The percentage of light transmitted through an IPS LCD sub-pixel is an important consideration to sub-pixel design. Therefore, the fabrication sequence described in this disclosure that creates a storage capacitor within an AMNR based IPS LCD sub-pixel provides an important contribution to light transmission.

Figure 5A:
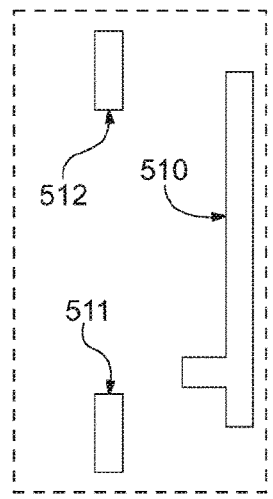
FIGS. 5A-5D schematically show an exemplary process for forming a dual select IPS LCD sub-pixel circuit without column inversion with two AMNRs and a storage capacitor formed with concurrently deposited and patterned AMTF first layer, with the exemplary process using four photolithographic patterning masks.
Figure 5B:
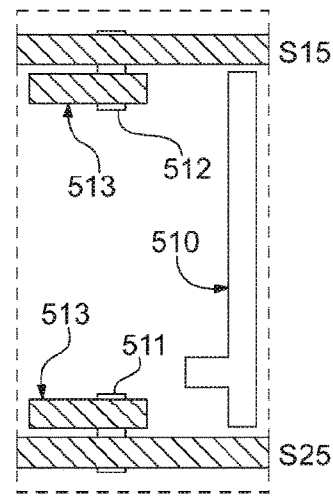
Figure 5C:
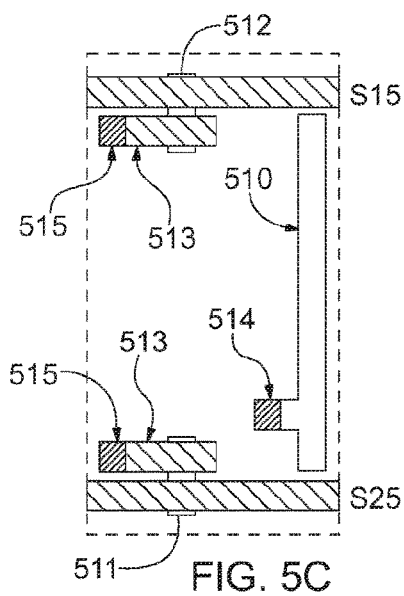
Figure 5D:
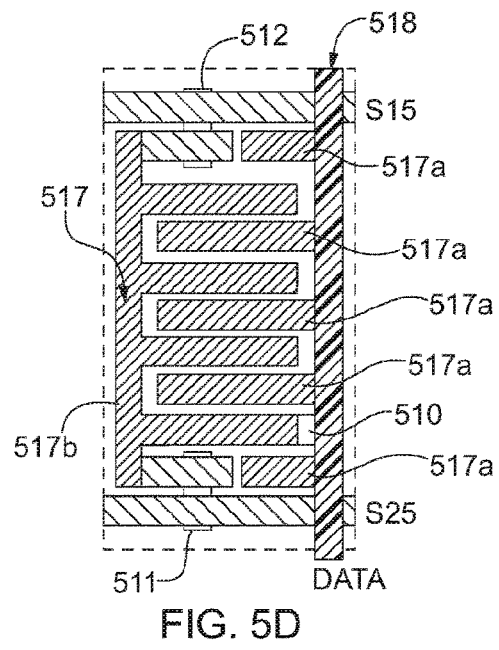

The layout and cross section provided in FIGS. 6A-6B illustrate that a storage capacitor 520 formed by the overlap between a lower AMTF layer containing components 510, 511, 512 and a data signal interconnect 518 is analogous between the AMNR based IPS LCD sub-pixel that enables dot inversion (e.g., FIGS. 4A, 4B) and the AMNR based IPS LCD sub-pixel that only enables row inversion, FIG. 5D. The connection between the select signal ITO electrode 517b of the liquid crystal capacitor 517 and the storage capacitor lower electrode 510 may be made through a contact 514 through the ILD layer 534 and the tunnel barrier layer 532, FIG. 6B.

Figure 7A:
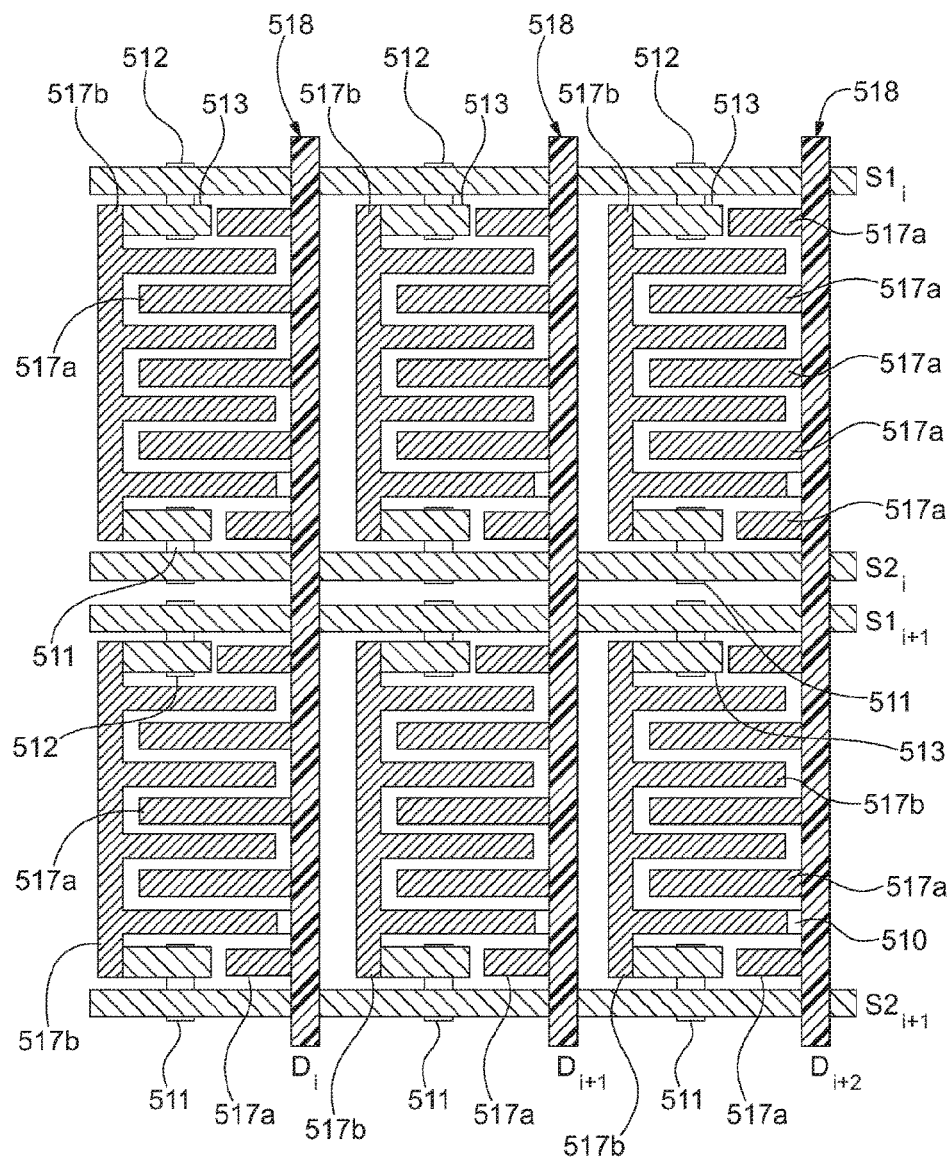
FIGS. 7A-7B schematically show the means through which individual sub-pixels may be connected to form a matrix of sub-pixels that may be addressed independently with row inversion but without column inversion.
Figure 7B:
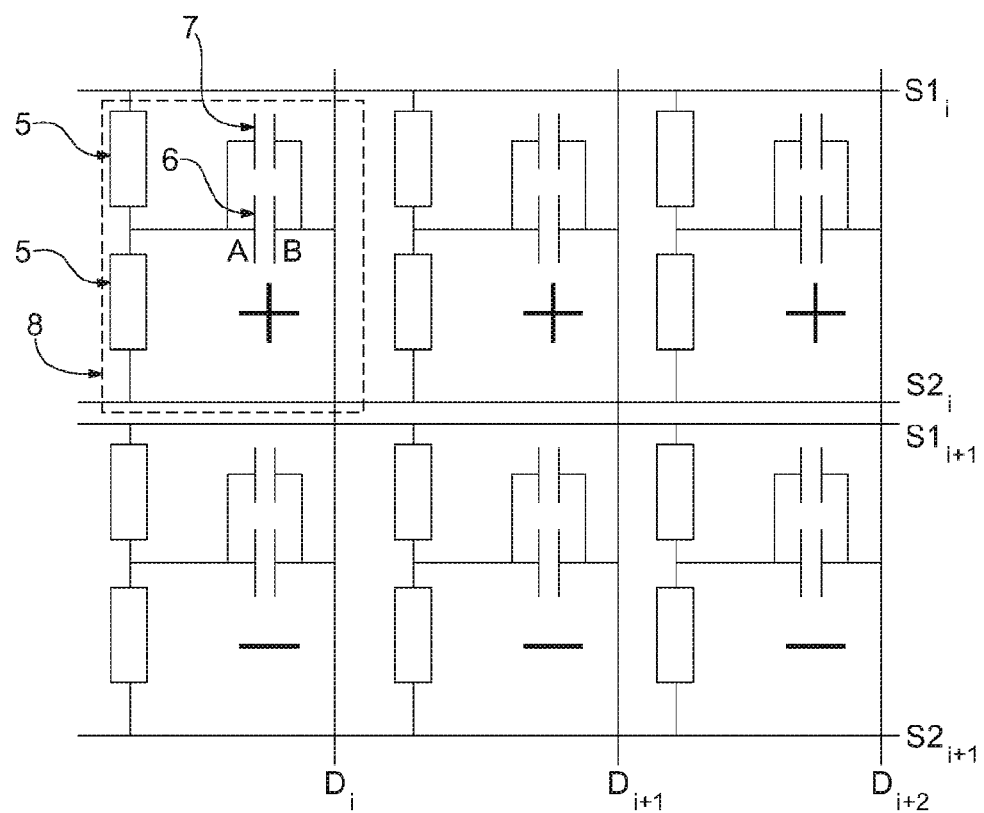

FIGS. 7A-7B provide a schematic representation of an array of AMNR based IPS LCD sub-pixels that enables row inversion but not dot inversion. There are no select line bridges in the exemplary array, and the select lines $S1_i$, $S2_i$ for a sub-pixel are located on opposite sides of the sub-pixel. The polarities of the sub-pixels is represented as + and − in the circuit diagram array.

These and other advantages of the present invention will be apparent to those skilled in the art from the foregoing specification. Accordingly, it will be recognized by those skilled in the art that changes or modifications may be made to the above-described embodiments without departing from the broad inventive concepts of the invention. It should therefore be understood that this invention is not limited to the particular embodiments described herein, but is intended to include all changes and modifications that are within the scope and spirit of the invention as set forth in the claims.

What is claimed is:

1. An in-plane switching liquid crystal sub-pixel circuit, comprising:
   first and second amorphous metal non-linear resistors each having a respective lower electrode interconnect comprising an amorphous metal thin film;
   a storage capacitor having a lower capacitor electrode comprising an amorphous metal thin film,
   wherein the lower electrode interconnects and lower capacitor electrode are disposed within the same plane.

2. The sub-pixel circuit of claim 1, wherein the amorphous metal thin film of the lower electrode interconnects and of the lower capacitor electrode have a thickness of about 50 nm or less.

3. The sub-pixel circuit of claim 1, comprising a dielectric layer disposed over the lower electrode interconnects and lower capacitor electrode, and wherein the storage capacitor comprises a data signal interconnect disposed above the lower capacitor electrode with a portion of the dielectric layer disposed therebetween, whereby the data signal interconnect, the lower capacitor electrode, and the portion of the dielectric layer cooperate to provide the storage capacitor.

4. The sub-pixel circuit of claim 3, comprising two liquid crystal capacitor electrodes disposed in a plane over the dielectric layer, wherein the liquid crystal capacitor electrodes and data signal interconnect are disposed in the same plane.

5. The sub-pixel circuit of claim 4, comprising an upper contact electrically connected between the amorphous metal non-linear resistors, the upper contact electrically connected to a selected one of the liquid crystal capacitor electrodes.

6. The sub-pixel circuit of claim 3, comprising:
   at least one select line comprising a crystalline metal disposed over the dielectric layer, the at least one select line having first and second segments with a gap disposed therebetween, with the lower electrode of a selected one of the amorphous metal non-linear resistors disposed in the gap between the first and second segments; and
   an interconnect bridge electrically connected to the first and second segments of the select line, the bridge disposed above the lower electrode of the selected amorphous metal non-linear resistor.

7. The sub-pixel circuit of claim 6, wherein the interconnect bridge extends from the first and second segments into the plane of the liquid crystal capacitor electrodes.

8. An array of the sub-pixel circuits of claim 1, comprising a tunnel barrier layer disposed over the lower electrode interconnects of the first and second amorphous metal non-linear resistors.

9. An array of the sub-pixel circuits of claim 6 arranged in a row/column matrix and configured to independently control the electric field applied to each sub-pixel liquid crystal capacitor that, along a matrix row, alternates the position of the interconnect bridge from the select line physically located below the liquid crystal capacitor electrodes to the select line physically located above the liquid crystal capacitor, then back to the select line physically located below the liquid crystal capacitor.

10. An array of the sub-pixel circuits of claim 1 arranged in a row/column matrix configured to independently control the electric field applied to each sub-pixel liquid crystal capacitor.

* * * * *